United States Patent [19]
Ball et al.

[11] 3,826,370
[45] July 30, 1974

[54] ROTARY FILTER APPARATUS HAVING MEANS FOR CONTROLLING THE LEVEL OF FILTRATE

[75] Inventors: Harry Ball, Piscataway; Henry A. Steward, Califon, both of N.J.

[73] Assignee: Technical Fabricators, Inc., Piscataway, N.J.

[22] Filed: May 29, 1973

[21] Appl. No.: 364,364

[52] U.S. Cl. .................. 210/109, 210/387, 210/401
[51] Int. Cl. .......................................... B01d 33/12
[58] Field of Search ............ 210/109, 387, 66, 391, 210/401, 402

[56] References Cited
UNITED STATES PATENTS

| | | | |
|---|---|---|---|
| 2,823,806 | 2/1958 | Harlan | 210/387 |
| 3,206,030 | 9/1965 | Estabrook | 210/387 X |
| 3,332,553 | 7/1967 | Casson | 210/387 X |
| R24,430 | 2/1958 | Hornbostel | 210/387 |

Primary Examiner—Roy Lake
Assistant Examiner—DeWalden W. Jones

[57] ABSTRACT

A rotary filter has a rotary drum with a perforated circumferential wall, the drum extending partly into a tank containing a slurry to be filtered. A sheet of a filter medium is wrapped around the circumferential wall. A first standpipe extends into the drum through a hollow bearing shaft from a filtrate pump, for withdrawing filtrate from the drum, and a second standpipe extending into the upper portion of the drum by way of the hollow bearing shaft is connected to a vacuum pump for separately withdrawing air. A weighing device is positioned to provide an output corresponding to the level of the filtrate in the drum, for maintaining this level within a given range by controlling the operation of the filtrate pump for the purpose of separately withdrawing the air and filtrate and prevent them from mixing.

14 Claims, 9 Drawing Figures

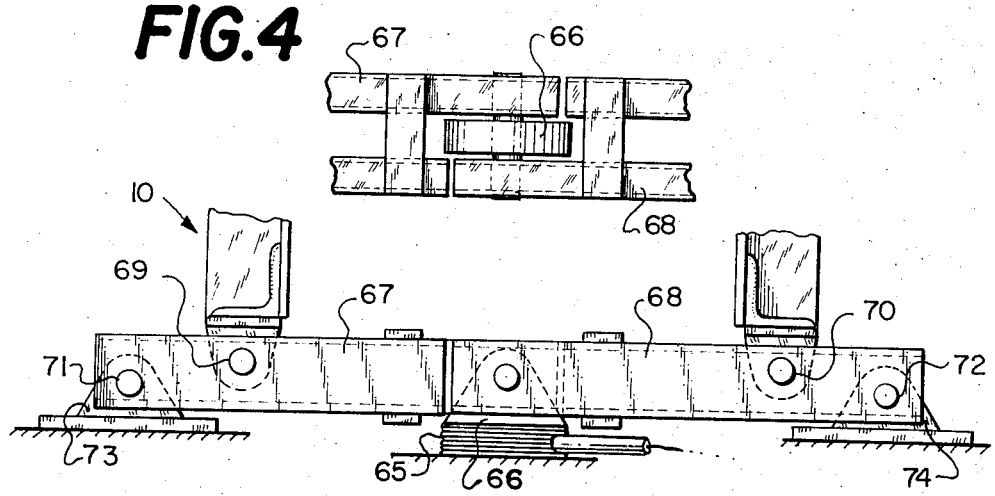
FIG. 4
FIG. 3
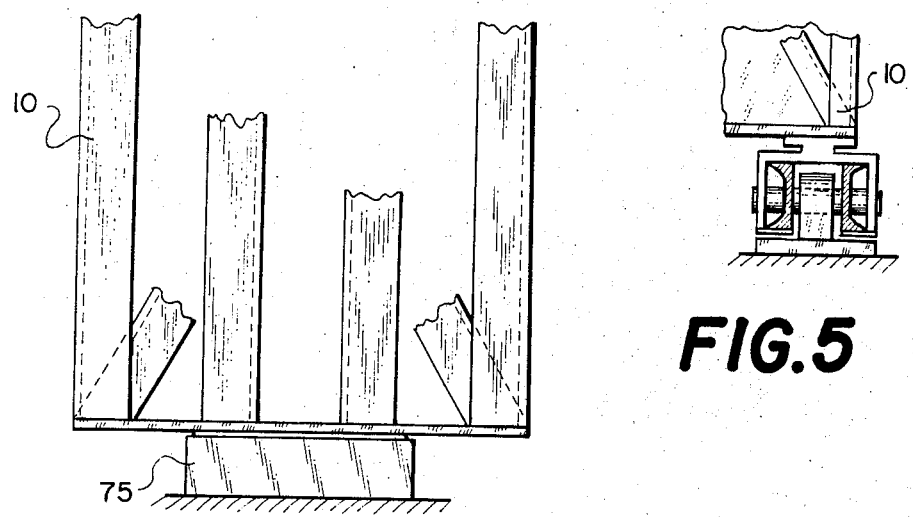
FIG. 5
FIG. 6

ROTARY FILTER APPARATUS HAVING MEANS FOR CONTROLLING THE LEVEL OF FILTRATE

This invention relates to rotary filters of the type having a rotatable drum with a horizontal axis, wherein the drum has a filter surface extending into a tank containing a slurry to be filtered. The invention is more particularly directed to a rotary filter of this type including means for maintaining the level of filtrate within the drum within a given range.

One type of rotary filter of the type to which the present invention is directed is disclosed in U.S. Pat. No. 3,651,946, which issued on Dec. 31, 1969 on an application of the present inventors. In this arrangement, the rotatable drum has a perforated circumferential surface and is supported within the slurry tank by means of a hollow bearing shaft. The shaft extends completely through the drum and has therein an aperture, so that filtrate may be withdrawn from the drum by way of the hollow shaft. Further in accordance with this patent, a supply of a disposable sheet filtering material, such as newsprint, is provided, the sheet being wrapped around the circumferential surface of the drum, so that solids separated from the slurry are retained on the sheet. The end of the sheet is continually stripped from the drum and disposed of. In the region of the drum not extending into the slurry, it is apparent that the solid material on the sheet is partially dried due to the suction action from the hollow shaft, which draws a certain amount of air through the sheet material and solids disposed thereon, and into the drum.

In a further rotary filter device of the type with which the present invention is concerned, as disclosed in application Ser. No. 191,507, now U.S. Pat. No. 3,791,527, of the present invention, filed on Oct. 21, 1971, a modification of the arrangement of U.S. Pat. No. 3,651,946 is provided in which a continuous web is provided surrounding the drum, with guide means being provided to strip the web from the drum at a given point on the periphery of the drum. In this arrangement, the filtering sheet material is fed and supported on top of the web. The above described rotary filters are merely exemplary of the art of rotary filters, and it will be apparent that the present invention is also applicable in other types of rotary filters.

While the above described filters have been found to be satisfactory for their intended purposes for filtration of many forms of slurries, it has now been found that problems are encountered in the use of such filters in the filtering of synthetic and natural resin emulsions, such as PVC emulsions, acrylic emulsions and butadiene styrene. Such materials have the characteristic that they are sensitive to air, i.e., the materials tend to form a film or harden upon exposure to air. Since rotary filters of the above disclosed type all permit the air being sucked through the exposed portion of the drum to be carried away in the same lines as the filtrate, it is apparent this air-filtrate mixture will cause hardening or film forming in materials of the above type. One result of this reaction in the drum is of course, that the system may become clogged, and that surfaces in the system require frequent cleaning. This of course considerably reduces the efficiency of the system. Normally the filtrate lines from a drum also handle the air being sucked through the upper exposed portion of the drum. This results in a foaming frothing mixture. This air/emulsion froth forms gel particles.

In the operation of rotary filters of the present invention, it is of course desirable and necessary that the liquid or filtrate outlet connection to the drum be separate and always be beneath the surface of the filtrate in the drum, and a suction (vacuum) outlet connection to the drum be separate and above the surface of the filtrate in the drum since otherwise the efficiency of the system will be reduced and excessive amounts of air will be drawn through and mixed with the filtrate. It is consequently desirable in such systems to provide a means for determining the filtrate level, and to control the operation of the pump to maintain the filtrate level above the liquid outlet connection.

In one suggested arrangement for determining the level of the filtrate in the drum, a liquid level sensor or the like is provided in the drum itself, being connected to the exterior of the drum by way of the hollow shaft. Such a liquid level sensor may be connected to control the filtrate pump connected to the hollow shaft. Such an arrangement is not suitable, however, in the filtering of synthetic and natural resin emulsions, since the emulsions have a tendency to build upon the sensors, and hence they become insensitive. It is thus apparent that sensors such as conductivity meters, capacitance meters or sonar meters or the like, are not suitable for use in the control of the level of the filtrate.

The present invention is directed to a system for maintaining the level of filtrate in the drum of a rotary filter whereby the above-discussed disadvantages of known rotary filters are overcome. In accordance with the invention, the level control system is adapted for use in a rotary filter of the type having a tank for containing a slurry to be filtered, and a rotary drum having a horizintal axis. The rotary drum is supported for rotation about its axis by means of shaft means, so that a portion of the drum extends into the tank for contacting the slurry. The drum has a filter surface, for example on its circumferential surface, so that the filter surface contacts the slurry in the tank. A filtrate pumping device arranged externally of the drum is connected to the interior of the drum by way of a hollow shaft, so that the desired filtrate passes through the filter surface into the drum and is withdrawn by the pumping means, while solid materials are deposited on the exterior of the filter surface. Thus far, it is apparent that the above components of the system of the invention are of similar type to the structures of the above stated U.S. Pat. No. 3,651,946 and U.S. patent application Ser. No. 191,507. In accordance with the present invention, the filtrate pump is connected to the interior of the drum by way of a fixed conduit extending through a hollow bearing shaft which terminates in a standpipe extending downwardly from the axis of the drum on the inside thereof, the open end of the standpipe being adjacent the bottom of the drum. In addition, a second standpipe extends in the drum upwardly from the axis thereof and terminates in an open end adjacent the top of the drum. This standpipe is connected by way of a conduit extending through a hollow bearing shaft to a vacuum pump connection, the second standpipe and conduit also being stationary.

In order to control the filtrate pump to maintain the level of the filtrate within a given range in the drum, a support structure is provided for supporting the tank and the bearings in which the hollow shaft is journaled. Suitable means are provided for continuously weighing the combined structure including the tank and filtrate, so that a quantity is produced corresponding to the amount of liquid in the rotary filter assembly, thereby providing an indication of the level of the filtrate in the drum. This quantity is applied as a control signal to the filtrate pump, in order to turn the filtrate pump on and off, so that the filtrate level may be maintained within the given desired range. For example, it is of course desirable that the lower level of the filtrate be above the bottom of the open end of the standpipe extending to the bottom of the drum, and that the upper level of the filtrate be below the open end of the standpipe extending to the top of the drum.

A cover may be provided over the top of the upwardly extending standpipe, in order to prevent splashing of filtrate into the vacuum connection.

With this arrangement, it has been found that the filtrate level within the drum may be reliably maintained within the desired range, since the sensing device, i.e., the weighing apppartus, is not subject to being rendered insensitive by the formation of film or solidification of material within the drum. In addition, by the provision of the upwardly extending standpipe and vacuum connection, the air within the drum is prevented from mixing with the filtrate, and as a consequence, the formation of film and solidification of the filtrate is eliminated. This of course provides the advantage that the cleaning of the drum and other components of the system is necessary at considerably less frequent intervals than heretofore necessary, and also that the cleaning of the apparatus is less difficult.

While the invention is not limited to the form of weighing apparatus employed, it is preferable that pressure sensitive devices commonly known as load cells be employed. In a particularly advantageous arrangement, the support structure for the system is provided with a plurality of legs or similar support points, so that the structure is hinged to a base at at least one of such points, and is supported on the base by means of the load cell at at least another of the points, thereby reducing the required measuring capacity of the load cell.

In order that the invention will be more clearly understood, it will now be described in greater detail with reference to the accompanying drawings, in which:

FIG. 3 illustrates a modification of a portion of the apparatus of FIG. 1, illustrating a different arrangement for application of a load cell in the apparatus;

FIG. 4 is a top view of a portion of the arrangement of FIG. 3;

FIG. 5 is a side view of a portion of the arrangement of FIG. 3;

FIG. 6 is a simplified illustration of a further arrangement for weighing the apparatus of FIG. 1;

Figure 1:
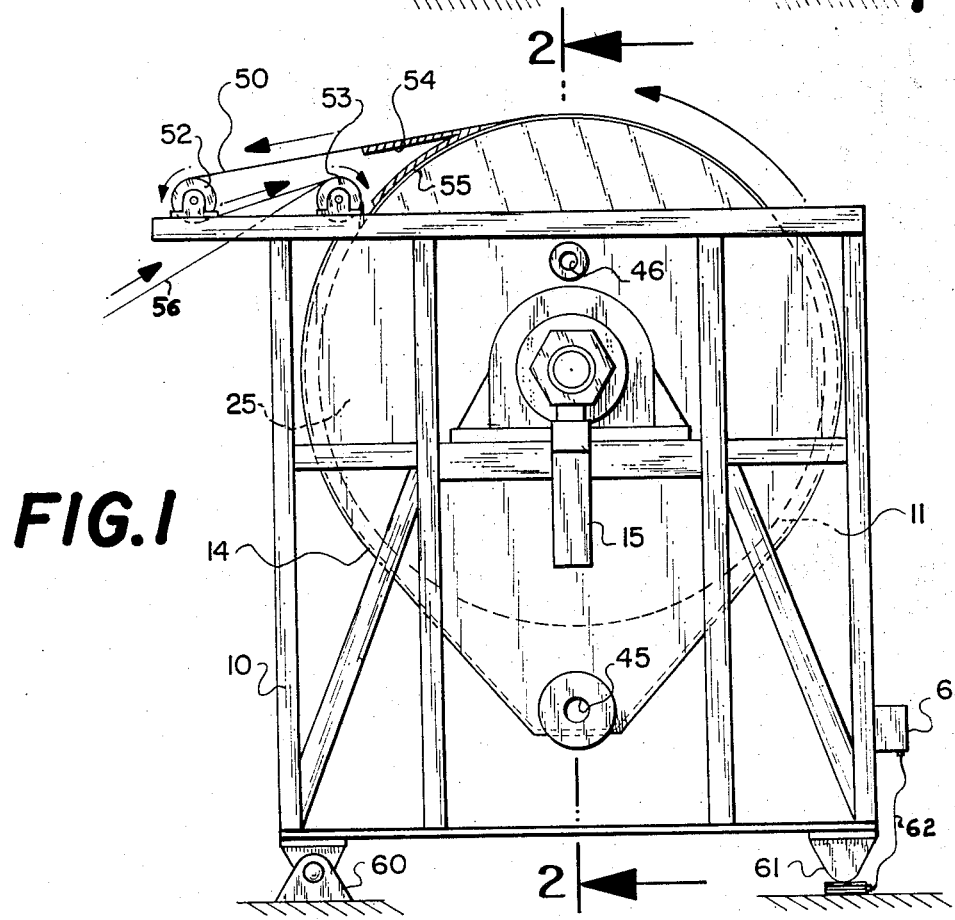
FIG. 1 is an elevational view of a rotary filter apparatus incorporating a filtrate level controlling system in accordance with the invention.

Referring now to the drawings, and more in particular to FIG. 1, therein is illustrated a rotary filter apparatus of the type which may incorporate the filtrate level control system in accordance with the present invention. It is to be pointed out that these figures represent a simplified illustration of the apparatus disclosed in co-pending U.S. Ser. No. 191,507, although the representation of such an apparatus is not intended to be limiting with respect to the disclosure of the present invention.

It will thus be apparent that the system in accordance with the invention may also advantageously be employed in combination with the apparatus disclosed in U.S. Pat. No. 3,651,946, as well as other conventional rotary filter devices, such as scraper filters, string discharge filters, and roll discharge filters.

Figure 2:
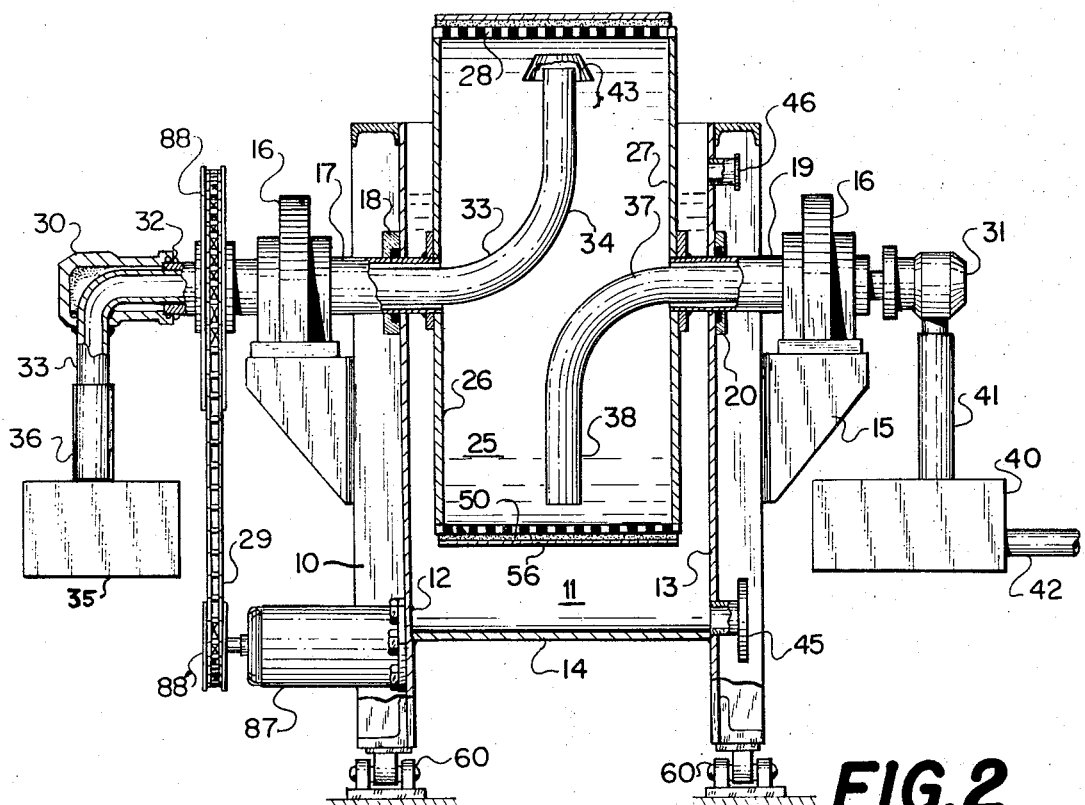
FIG. 2 is a partially cross sectional view of the apparatus of FIG. 1 taken along the lines 2—2.

FIGS. 1 and 2 illustrate a support structure indicated generally by the numeral 10, for example formed of suitable structural beams, for supporting therein a tank 11 denoted generally by the numeral 11. As shown in FIG. 2, the tank 11 includes a pair of flat side members 12 and 13 supported by the support structure 10, and a member 14 extending between the sides 12 and 13. The sides 12 and 13 extend generally upwardly to the top of the support structure 10. As more clearly seen in FIG. 1 in dash lines, the bottom of the member 14 is generally curved and the upper portions thereof extending to the top of the tank may be generally vertical. This configuration is not limiting, it being preferable to provide curved surfaces, for example, in the bottom of the tank to facilitate cleaning, and so that the outline of the tank generally conforms to, and is larger than, the drum which extends thereinto.

A bearing support 15 is provided on each side of the support structure 10, and a suitable conventional bearing 16 is mounted on each of the supports 15. A hollow shaft 17 journaled in one of the bearings 16 extends into the tank 11 through the wall 12 by way of a suitable conventional seal 18. A hollow shaft 19, coaxial with the shaft 17, extends through the tank wall 13 by way of a suitable conventional rotary seal 20, and is journalled in the other bearing 16. A drum 25 is provided extending partially into the tank 11, the drum 25 having a horizontal axis. The shaft 17 is affixed to one side 26 of the drum 25, and the shaft 19 is affixed to the other side wall 27 of the drum, the side walls 26 and 27 being coaxial with the shafts 17 and 19. The circumferential surface 28 of the drum is perforated, for example in the manner disclosed in co-pending application Ser. No. 191,507. Suitable means are provided for rotating the hollow shafts 17 and 19, to effect the rotation of the drum 25 in the tank. For example, a sprocket wheel 88 on the shaft 17 may be coupled by means of a chain drive 29 to a sprocket wheel 88' rotated by a conventional motor 87. The motor 87 may be suitably affixed to the support members 10. It is of course apparent that any other suitable drive devices may be employed for rotating the shafts 17 and 19. A rotary pipe coupling 30 is provided on the external end of the shaft 17, and a similar rotary pipe coupling 31 is provided on the external end of the shaft 19. The couplings 30 and 31 are held in stationary positions, for example, on the support structure 10 by suitable means (not shown). The coupling 30 is provided with a rotary seal 32 bearing against the shaft 17. A pipe 33 extends from externally of the coupling, through the coupling 30, and thence into the drum 25. The end of the pipe 33 within the drum 25 extends upwardly in the form of a standpipe 34, the upper end of the standpipe 34 terminating adjacent the inner surface of the circumferential shell 28 at the top of the drum. It is thus apparent that the pipe 33 and standpipe 34 are stationary, and provide an external connection to the upper regions of the drum 25. The external end of the pipe 33 is connected to a suitable vacuum pump 35 by way of a vacuum connection 36, such as a conventional coupling. The rotary pipe coupling 31 is constructed in the same manner as the coupling 30, and in this case a pipe 37 extends from externally of the coupling 31, through the coupling and into the drum 25, the inner end of the pipe 37 terminating in a downwardly extending standpipe 38, so that the open bottom end of the standpipe 38 is adjacent the inner surface of the circumferential member 28 at the bottom of the drum 25. The external end of the pipe 37 is connected to a suitable conventional filtrate pump 40 by way of a conventional coupling 41. The filtrate pump 40 is provided with a filtrate output connection 42.

In order to prevent liquid material from splashing into the open upper end of the standpipe 34, the standpipe may be provided with a suitable baffle 43 between the standpipe 34 and the circumferential member 28.

A suitable tank inlet and drain connection 45 may be provided in the bottom of the tank 11, for example in the wall 13, for introducing slurry to be filtered into the tank 11, and for draining the tank when necessary. Similarly, an overflow connection 46 may be provided in the upper portion of the tank 11, above the shafts 17 and 19, for example in the wall 13, to prevent the filling of the tank 11 to an excessive extent.

In accordance with the rotary filter disclosed in co-pending application Ser. No. 191,507, a web 50 may be provided extending around the drum in the region thereof in the tank 11, the web 50 also extending around rollers 52 and 53 supported on the support structure 10, so that the web 50 is stripped from the drum at one point externally of the tank 11, and is thence directed by the rollers 52 and 53 back to the circumferential surface of the drum. A suitable stripping member 54 may be provided to assist in the stripping of the web from the drum, the member 54 having an extension 55 between the points at which the web leaves and rejoins the surface 28, to prevent insofar as possible the flow of air through the surface 28 in this region. A sheet filter material 56 is fed to the web around the roller 53 to that the rotation of the drum, in the direction indicated by the arrow, carries the sheet filter 56 along with the web, downwardly into the tank 11, and thence upwardly out of the tank through a discharge area on the web 50 after it has been stripped from the drum. This portion of the structure of a rotary filter is fully disclosed in the co-pending application, Ser. No. 191,507, and does not form a part of the present invention.

It is of course apparent that other arrangements may be employed for feeding the sheet filter material to the surface of the drum, for example as shown in U.S. Pat. No. 3,651,946, and the present invention is not limited to such structure. As is more clearly seen in FIG. 2, two adjacent corners of the support structure 10 are provided with pivot supports 60, the remaining two corners of the structure being supported on suitable weight sensors 61, only one of which appears in FIG. 1. The weight sensors are connected to a suitable control circuit, for example in a lead 62 affixed to the support structure 10, for control of the filtrate pump 40 in a manner to be more fully discussed in the following paragraphs.

The weight sensors 61 may be of any conventional type such as load cells or other weight sensing devices adapted to provide an electrical output corresponding to a weight applied thereto. For example, the weight sensors may be Taylor Diaphragm-type load elements, as manufactured by the Taylor Instrument Co., of Rochester, N.Y.

In the arrangements of FIGS. 1 and 2, as above discussed, the support structure, is pivoted at two of its corners, and the weight is sensed at the remaining two corners thereof. Each of the corners having weight sensors therefore detect one fourth of the total weight of the device, and the signals corresponding to the weight at these corners are added, as will be discussed in the following paragraphs, to provide a signal corresponding to the full weight of the device.

Alternatively, as illustrated in FIGS. 3-5, a weight sensor 65 may be centrally disposed with respect to a pair of adjacent legs of the support structure 10, the top of the weight sensor being provided with a pivot support member 66. A pair of beams 67 and 68 pivoted to the member 66 extend outwardly to pivot points 69 and 70 at the bottoms of the pair of adjacent legs of the support structure 10, and thence to pivot points 71 and 72 respectively, the pivot points 71 and 72 being formed in a suitable pivot blocks 73 and 74 respectively, resting on the ground. While FIGS. 3-5 only show the interconnection between a single load sensor and a pair of adjacent legs of the support structure, it is apparent that if desired a similar structure may be employed at the remaining two legs of the structure.

The arrangement of the weight structures as illustrated in FIGS. 1-5 provide the advantage that the load capacity of the weight sensors may be minimized. In other words, it is not necessary to employ a single weight sensor capable of bearing the full load of the structure. Thus, in the arrangement of FIGS. 1 and 2, each weight sensor carries only one fourth of the total load. In the arrangement of FIGS. 3-5, the weight applied to the weight sensors may be reduced even more, depending upon the ratios of the distances between the pivot points at the beams 67 and 68. Alternatively, of course, as illustrated in FIG. 6, a single weight sensor 75 may be provided for supporting the entire support structure 10. If desired, the weight sensor 75 may be in the form of a mechanical scale.

Figure 7:
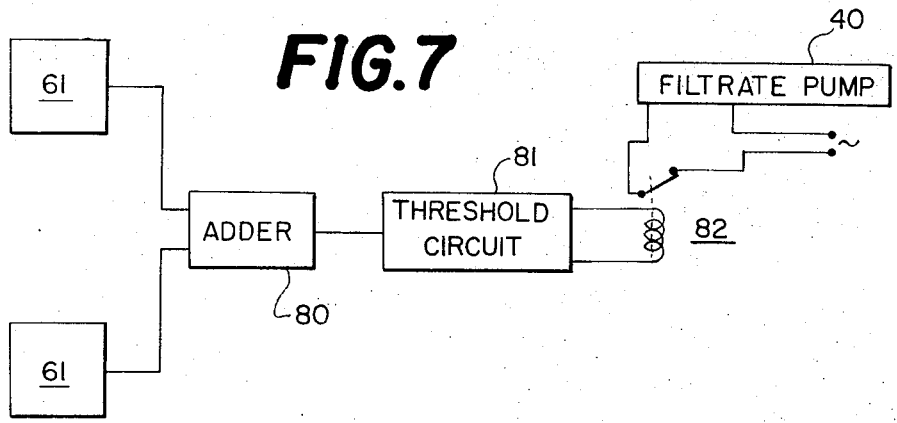
FIG. 7 is a simplified block diagram of the electrical control system for controlling the filtrate pump in accordance with the output of the load cell, which may be employed in the apparatus of FIG. 1.

A block diagram of a circuit for employing the weight sensing devices to control the filtrate pump is illustrated in FIG. 7. In this arrangement, assuming the use of a pair of weight sensors 61 as in the embodiment of the invention in FIGS. 1 and 2, the outputs of the weight sensors, which are proportional to the loads applied thereto, are applied to a conventional analog adder 80 for producing an output signal corresponding to the added weight. This output signal is applied to a threshold circuit 81. The threshold circuit 81, which may also be of conventional nature, such as for example, a Schmitt trigger circuit, provides an energizing output to a relay 82 when the input signal is above a given magnitude. The threshold level may thus correspond to the weight of the entire structure when the drum is filled to the maximum level desired. At this time, the contacts of the relay 82 restore power to the filtrate pump.

Figure 8:
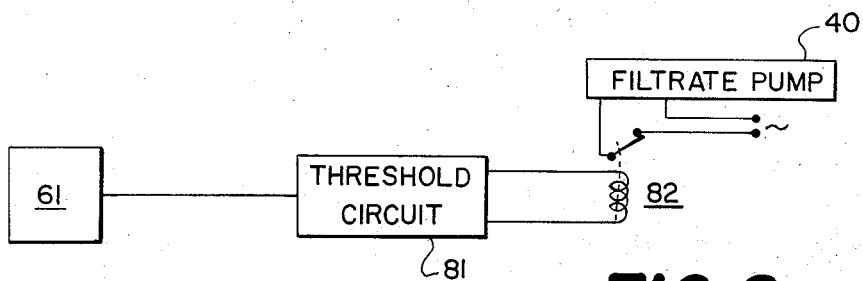
FIG. 8 is a simplified block diagram of a control system that may be employed for controlling the filtrate pump in the arrangement of FIGS. 3–5.

Alternatively, as illustrated in FIG. 8, if a single weight sensor 61 is employed, it is of course not necessary to employ an adder, the output of the weight sensor 61 being applied directly to the threshold circuit 81.

The arrangements of FIGS. 7 and 8 are illustrative only, and it is apparent that many other circuits and techniques may be employed to control the filtrate pump as a function of the weight of the filtering apparatus. For example, if in the arrangement of FIG. 6 a mechanical scale is employed, the scale may be provided with the electrical contacts adapted to close or open at a given displacement of a mechanical member therein, in which case the contacts may be employed directly or by way of relays to control the operation of the filtrate pump without requiring the use of a threshold circuit. The threshold circuit 81 may also be designed so that in addition to effecting the restoring of power to the filtrate pump at a given maximum sensed weight, it also senses a lesser weight for removal of power from the filtrate pump. The circuit for controlling the operation of the filtrate pump may thus be varied in accordance with the particular type of weight sensor employed.

In operation of the arrangement according to the invention, a slurry to be filtered is introduced into the tank 11, for example, by way of the inlet connection 45, the tank being filled to the level of the overflow 46. The drum 25 is rotated, by means of the motor 87. The vacuum pump 35 connected to the upwardly extending standpipe 34 is employed to remove air from within the drum 25 for the purpose of partially drying the filtered material on the drum surface by passage of air therethrough, and also to eliminate the air from mixing with the filtrate in order to eliminate the air from mixing with the filtrate in order to minimize the problems as above stated with respect to exposure of some filtrate materials to air. Baffle 43 on top of the standpipe 34 inhibits the splashing of slurry within the drum into the standpipe 34.

The filtrate pump 40 withdraws the filtrate from the drum by way of the downwardly extending standpipe 38. In order to maintain the level of filtrate within the drum between set limits, so that the filtrate neither flows into the standpipe 34 nor is below the level of the lower standpipe 38, the weight of the structure is measured by means of the weight sensors. In one form of control, when the detected weight of the apparatus is above a given level corresponding to a filtrate level at its maximum desired point, the weight sensors effect the restoring of power to the filtrate pump. As an example, the drum may be rotated at a speed in the order of 1 to 10 minutes per revolution (mpr).

Figure 9:
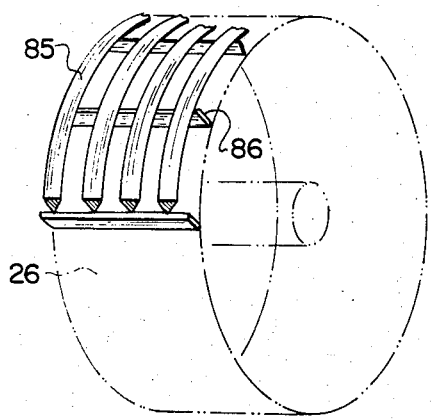
FIG. 9 is a perspective illustration of a portion of one form of drum surface that may be employed in the invention.

The filter medium employed on the surface of the drum may be any porous filter media, such as a nonwoven filter medium, for example, paper, or alternatively it may be a woven material. The slurry tank may be provided with an agitator according to conventional practice, although for the purpose of the present invention, this is not necessary. In one form of apparatus according to the invention, the circumferential surface 28 of the drum is in the form of a conventional sheet having perforations extending therethrough. In a particularly advantageous arrangement, however, the drum surface may be formed of a wedge wire screen, such as manufactured by the Johnson Division of Universal Oil Products, St. Paul, Minn. In this arrangement, such as illustrated in the partial perspective view of a portion of the drum in FIG. 9, the surface of the drum is formed of a plurality of wires 85 extending around the drum at the periphery thereof, the wires 85 having triangular cross sections with one of the flat sides of the cross sections forming the surface of the drum. The wires 85 are supported by transversely extending bars 86 within the drum.

While the invention has been described with reference to a limited number of embodiments, it will be apparent that many modifications and variations may be made therein without departing from the invention, and it is therefore intended in the following claims to cover each such variation and modification as falls within the true spirit and scope of the invention.

What is claimed is:

1. In a rotary filter of the type having a tank for containing a slurry to be filtered,
   a rotary drum with a horizontal axis,
   shaft means supporting said drum for rotation on said axis with a portion of the drum extending into said tank,
   said drum having a filter surface positioned to contact slurry in said tank,
   filtrate pumping means, and
   conduit means connecting said pumping means to the interior of said drum by way of said shaft means;
   the improvement wherein said conduit means comprises a first standpipe extending from said hollow shaft means downwardly in said drum and terminating adjacent the interior circumferential surface of the drum,
   said rotary filter further comprising vacuum pump connection means including a second standpipe extending through said shaft means and terminating adjacent the top of the interior circumferential surface of said drum,
   means for determining the weight of said rotary filter, and
   means responsive to a determined weight of said rotary filter for controlling the operation of said filtrate pumping means for maintaining the level of filtrate within said drum in a range between the terminations of said standpipes.

2. The rotary filter of claim 1 wherein said shaft means comprises first and second hollow shafts extending for rotation through opposite sides of said tank, said conduit means extending through said first hollow shaft to said filtrate pumping means, said vacuum pump connection means extending through said second hollow shaft, and rotary seal means between said first hollow shaft and said conduit means and between said second hollow shaft and said vacuum connection means, for preventing drainage of slurry from said tank.

3. The rotary filter of claim 2 comprising means for rotating one of said hollow shafts to effect the rotation of said rotary drum in said tank.

4. The rotary filter of claim 1 further comprising baffle means positioned between the upper end of said second standpipe and the internal surface of said drum, for inhibiting splashing of filtrate into said second standpipe.

5. The rotary filter of claim 1 wherein said means for determining the weight of said rotary filter comprises weight sensing means, and means for supporting at least a portion of the weight of said rotary filter on said weight sensor means.

6. The rotary filter of claim 5 wherein said supporting means has a plurality of support legs, comprising means for pivotally supporting at least one of said legs on a fixed surface and means for supporting at least another of said legs on said weight sensor means.

7. The rotary filter of claim 5 wherein said weight sensor means comprises load cell means.

8. The apparatus of claim 5 wherein said means for supporting comprises a support structure, said tank being mounted in said support structure, said support structure having four legs, and means for distributing the weight of said rotary filter between a fixed surface and said weight sensor means.

9. The rotary filter of claim 8 wherein said distributing means comprises means for pivotably mounting two adjacent legs of said support structure on said fixed surface, said weight sensor means comprising a pair of load cell means, and means for supporting the other two legs of said support structure on separate ones of said load cell means.

10. the rotary filter of claim 8 wherein said weight sensor means comprises a load cell means, said load cell means being positioned between a pair of adjacent legs of said support structure, and wherein said means for distributing the weight of said rotary filter comprises a pair of beams pivoted on said load cell means and extending in opposite directions toward separate legs of said pair of legs, means pivoting said separate legs to separate said beams, and means for pivoting another point of each of said beams with respect to said fixed surface.

11. The rotary filter of claim 1 comprising a support structure for supporting said tank, said means for determining weight comprising load cell means positioned to support at least a portion of the weight of said device, threshold means, means connecting said threshold means to said load cell means, and means responsive to said threshold means for controlling the operation of said filtrate pumping means, whereby said filtrate pumping means is inhibited from operation when the level of filtrate within said drum exceeds a determined level.

12. The rotary filter of claim 11 wherein said load cell means comprises a plurality of load cells positioned to support weight at different points of said support structure, and wherein said means connecting said threshold means to said load cell means comprises adder means for summing the outputs of the separate load cells.

13. The rotary filter of claim 12 comprising means for pivotally supporting said support structure on a fixed surface, and means positioning said load cells at points spaced from said pivoting means, whereby said load cells each support only a portion of the weight of said rotary filter.

14. A system for controlling the level of filtrate in the rotary drum of a rotary filter of the type having shaft means supporting the drum for rotation on a horizontal axis, the lower portion of the drum extending into a tank adapted to contain a slurry to be filtered, a support structure for supporting the tank and including bearing means for said shaft, and filter means on said drum positioned to rotate with said drum whereby vacuum in said drum draws filtrate from the slurry into the drum; the system comprising a filtrate pump, a vacuum input connection, first conduit means extending from said pump through said shaft means and into said drum and terminating in an open end adjacent the lower circumferential surface of said drum, second conduit means extending from said input connection through said shaft means and into said drum and terminating with an open end adjacent the upper circumferential surface of said drum, means for weighing said rotary filter and means connected to said weighing means and responsive to the weight detected thereby for controlling said pump, whereby said pump maintains the level of filtrate in said drum within determined limits.

* * * * *